US006726564B2

(12) United States Patent
Hogan et al.

(10) Patent No.: US 6,726,564 B2
(45) Date of Patent: Apr. 27, 2004

(54) MAXIMUM BET TABLE GAME AND APPARATUS

(75) Inventors: Nicholas Kurt Hogan, Henderson, NV (US); Dennis A. Garcia, Henderson, NV (US)

(73) Assignee: Mikohn Gaming Corporation, Las Vegas, NV (US)

( * ) Notice: Subject to any disclaimer, the term of this patent is extended or adjusted under 35 U.S.C. 154(b) by 0 days.

(21) Appl. No.: 09/848,640

(22) Filed: May 3, 2001

(65) Prior Publication Data

US 2001/0024015 A1 Sep. 27, 2001

Related U.S. Application Data

(63) Continuation of application No. 09/293,525, filed on Apr. 15, 1999, now Pat. No. 6,568,682.

(51) Int. Cl.[7] .................................................. A63F 13/00

(52) U.S. Cl. ............................. 463/25; 463/12; 463/13; 273/309

(58) Field of Search ........................... 463/12–13, 9–11, 463/16–22, 25, 27; 273/309

(56) References Cited

U.S. PATENT DOCUMENTS 4,861,041 A 8/1989 Jones et al.
5,078,405 A 1/1992 Jones et al.
5,393,067 A 2/1995 Paulsen et al.
5,605,334 A * 2/1997 McCrea, Jr. ................ 273/309
RE35,864 E 7/1998 Weingardt
5,794,964 A 8/1998 Jones et al.
5,809,415 A * 9/1998 Rossmann ............... 455/422.1
6,146,270 A * 11/2000 Huard et al. .................. 463/12
6,386,973 B1 * 5/2002 Yoseloff ...................... 463/13

* cited by examiner

*Primary Examiner*—Mark Sager
*Assistant Examiner*—Aaron Capron
(74) *Attorney, Agent, or Firm*—Dorr, Carson, Sloan, Birney & Kramer, P.C.

(57) ABSTRACT

A methods of and apparatus for playing table card games are provided wherein with multi token maximum level betting and displayed rankings of winning hands return enhanced pay out. A pay table matrix listing has the enhanced payments for ranked hands. The method and apparatus uses and has token acceptors and sensors for each player. The sensors are coupled to a count and computer for registering any maximum level bet that receives enhanced return for predetermined winning card combinations. The apparatus and its method, thus allow each player the opportunity to bet multiple tokens before the cards are dealt and to win enhanced amounts of money should specific predetermined card combinations be obtained.

13 Claims, 5 Drawing Sheets

FIG.3
PROVIDING ONE OR MORE DECKS OF STANDARD PLAYING CARDS
POSTING A PAY TABLE OF HAND RANKINGS AND PAY OUT FOR MINIMUM TO MAXIMUM LEVEL BETS
EACH PLAYER BETTING TO PARTICIPATE IN THE GAME
ACCEPTING BETS BY EACH PLAYER PLACING ONE OR MORE TOKENS IN AN ACCEPTOR ADJACENT EACH PLAYER'S LOCATION
DEALING CARDS HANDS TO EACH PLAYER
WINNING PLAYERS RECEIVE PAY OUT AMOUNT BASED ON THE RANKING OF THEIR HANDS
ENHANCING TNE AMOUNT OF PAY OUT FOR MAXIMUM LEVEL BETS

MAXIMUM BET TABLE GAME AND APPARATUS

RELATED APPLICATIONS

This application is a continuation of U.S. patent application Ser. No. 09/293,525 filed Apr. 15, 1999 entitled "Maximum Bet Table Game Method and Apparatus" now U.S. Pat. No. 6,568,682 issued May 27, 2003.

FIELD OF THE DISCLOSURE

The present disclosure relates generally to casino or card room gaming involving card games with a predetermined pay table. More particularly, it relates to betting for an enhanced return to winning players participating in various casino or card room table games.

BACKGROUND OF THE INVENTION

Different betting games presently exist and are played at home and in casinos. Such games should necessarily be exciting, uncomplicated and easy to learn so as to avoid frustrating the players. Card games such as poker and "twenty one" have gained widespread popularity because of their established and well known ranking of hands and their known rules. Furthermore, each of these games usually involves continuous betting opportunities for the players thus increasing player participation and excitement. Lastly, the games move fairly quickly to maintain action and activity. All of these factors have created games that are widely accepted, known and played.

A common way of increasing the excitement and attraction of table betting games is the inclusion of additional betting opportunities and pay out schemes. For example, in a progressive jackpot scheme includes certain outcomes are designated for pay out of a progressive amount. In that progressive jackpot scheme, a portion of each player's progressive jackpot bet is provided to the progressive jackpot thereby increasing the jackpot amount.

Another method of increasing excitement for the players is to provide additional winning hands or winning possibilities. This has previously been accomplished by such means as adding wild cards to poker games. These additional winning opportunities can be accomplished by providing the player with the additional betting opportunities or by providing additional winning combinations of cards. Providing new and previously unavailable winning hands required imagination and must also fit certain characteristics in order to be economically feasible. In order for a large pay out to be feasible for gaming establishments, it is desirable that the odds of achieving a "jackpot" hand are within a predetermined range. By meeting these requirements, the game will be economically feasible for the gaming establishment to offer, and will also provide the opportunity for large jackpot pay out and large winning opportunities.

Betting games, and particularly card betting table games do not have the multi coin advantages of slot machine or video games. Table card games have existed for a long period of time wherein cards are dealt to the player by a single dealer and play commences from that point. Furthermore, the rules and practices for card dealt table games are well understood and easy to follow. As previously mentioned, this makes the betting game more attractive, well accepted and easy to play.

Video betting games have also increased in popularity due to their ease of play. These games are set up to mimic a table game using adaptations of table game rules and cards. Video games are also attractive to both players and gaming establishments because they can be played without the need for a dealer. This provides the players with the opportunity to play the video game in a somewhat isolated environment at the player's preferred pace. Furthermore, the use of a video format conveniently provides many additional pay out for maximum coins bet.

It has become common practice in gaming establishments to provide progressive jackpot pay out in connection with electronic or mechanical gaming devices, such as slot machines, video poker machines or keno machines. Typically a plurality or "bank" of machines are electronically interconnected to a common progressive jackpot meter. As gaming tokens are fed into each machine, the amount shown on the jackpot meter progresses incrementally until some lucky player lines up the winning combination, such as three or four 7's on the same row of a slot machine. In video poker, a Royal Flush normally wins the jackpot, although in some variations, a player must achieve a Royal Flush in an exact order, such as A-K-Q-J-10 from left to right, or in a particular suit, such as Spades. In video keno, a player typically must match 15 out of 15 numbers to win the progressive jackpot. Such variety is available to a limited extent on table games through side bets for accumulated progressive jackpots and the like. U.S. Pat. No. 5,393,067 enhances the attractiveness and excitement of live card games in general, and the card game known as "21" or blackjack in particular. By adding to such games a progressively increased pay out which is comparable in size to large jackpots which are now routinely won in casinos when playing slot machines large numbers of which are combined in a single, jackpot payoff system. The creation of progressive jackpots with slot machines is known and relatively easy because of the large number of such machines that are in operation and the ease with which these machines can be electronically combined. The progressive jackpots are generated by accumulating a portion of each bet placed in each machine on the system and establishing sufficiently low odds for winning the jackpot that the likelihood of winning the jackpot on any single game is relatively small. The electromechanical character of the machines and the absence of an intervening dealer who participates in each game on the part of the casino makes it simple and uncomplicated to administer and generate progressive jackpots, say, in excess of several million dollars.

The same is not true for live card games. Such games are neither mechanically nor electrically played, but require a dealer who represents the house (casino). This increases the difficulty of retaining parts of the bets placed during the games and accumulating them in a jackpot, with high odds against winning it. In addition, in live card games the dealer must determine when a player has a jackpot winning hand, which further complicates the setup, generation and payment of progressive jackpots.

U.S. Pat. No. 4,861,041, which is incorporated herein by reference, discloses a live card game, primarily poker or blackjack having progressive pay out. This patent includes an accumulation of a jackpot based on bets placed on a single card game. That is because no casino could keep track of bets placed on multiple tables in one place, much less placed on multiple tables in different gaming establishments within a given locality, be this a single city or an entire state or country.

Although the live card game disclosed in the '041 patent is capable of generating a progressive jackpot, it is necessarily of modest size for two reasons. First, the number of players that may participate in the jackpot is limited to the number of players on a particular table. Secondly, especially for blackjack, the probability of reaching 21 even with the combination of cards which has the smallest probability of reaching this number is relatively high. Consequently, players could win the jackpot in the system disclosed in the '041 patent frequently so that there is little time to accumulate more than a modest jackpot.

As a result, live card games can never match the large size of jackpots that can be won when playing mechanical or video slot machines. Live card games are popular as skill or knowledge of the game improves the players' chances of winning. There is no opportunity to win large sums of money such as the multi-million dollar progressive slot jackpots. Casinos participating in systems including thousands of slot machines that each provides a percentage of the bets into a common pool pay out for progressive jackpots.

Thus, to enhance the attractiveness of live card games and to provide greater player satisfaction, there remains a need to modify live card games so that truly large jackpots; e.g. in excess of $100,000 or $1 million, for example, can be won. An acceptor particularly adapted for use with an apparatus for providing a progressive jackpot pay out to a live casino table game, is disclosed in U.S. Pat. No. 5,078,405, incorporated herein and made a part hereof by reference as a teaching of at least one disclosure of an acceptor. Coin currency-accepting apparatuses and token verifying devices are well known commodities in the gaming business. The acceptor mounts at each player location of a live casino card gaming table of the type typically used in the play of Caribbean Stud (TM) Poker and "twenty one". Each player may place an optional bet to participate in a progressive jackpot pay out of a live casino card game by inserting a gaming token into the acceptor located at the players location. Each acceptor includes a light automatically illuminated by control circuitry to indicate bet acceptance and player participation in the progressive jackpot.

U.S. Pat. No. 5,794,964, incorporated herein and made a part hereof by reference, describes a method and apparatus for including a progressive jackpot component in a live casino table game. In addition to playing a live casino table game, each player makes an additional bet at the beginning of each hand to make that player eligible to win all or part of a jackpot. If during the play of the hand a player is dealt a predetermined arrangement of cards, the player wins a preselected percentage of the jackpot amount. In claims 28 and 32 thereof the amount is designated as a fixed fee. The jackpot may be considered progressive because amounts of the jackpot not won carry over to the next and following hands. Apparatus is provided to accept each gaming token bet for the jackpot component, to increment a jackpot meter displaying the jackpot amount, to decrement the jackpot meter whenever a winning hand is paid and to reset the apparatus for the next hand.

The present invention includes apparatus and method for enhanced pay out when there has been a maximum level bet made on a table card game hand. Consequently, the excitement of the card game is increased; since each player may choose to bet at the maximum level and to win an enhanced pay out that is more than proportionally greater than the standard propositions.

It is a feature of the present invention to enable each participant to choose to make a maximum level bet and be eligible to receive enhanced pay out for predetermined winning card combinations when that participant achieves that predetermined playing hand.

It is an advantage of the present invention that when the maximum level bet is made during typical table card games such as poker, "twenty one" or the like, the house will recover the added expense of enhanced pay out from the lost bets made at all connected tables.

It is an advantage of the present invention that when the maximum level bet is bet at typical table card games such as poker, "twenty one" or the like and that the players will enjoy these games of skill more and that the amount of play will increase.

It is a further object of the present invention to provide apparatus useful and methods of use in providing the enhanced pay out during casino or card room table games such as poker, "twenty one" or the like.

It is a further feature of the present invention to have a computer electronically interconnected to one or more gaming tables to monitor betting levels of each player and to record and automatically activate a display showing each player's participation and level of bet made.

It is an advantage of the present invention that the apparatus makes it easy for each table game card player to place a maximum level bet.

In summary, it is always desired to find a game that is easy to play, fast moving and potentially lucrative for the player and cost effective for the house. When the player is provided with a considerable amount of participation and additional winning based on maximum level betting, table card games of skill become much more attractive and enjoyable. Also, it is desirable to provide the players with enhanced winning opportunities, monetarily supported by the participants placing maximum level betting.

BRIEF SUMMARY OF THE INVENTION

The method of the present invention generally involves a typical casino or card room game modified to include an enhanced pay out. During the play of a "twenty one" game, for example, in addition to a normal bet, a player will have the option of making an additional bet that becomes part of, and makes the player eligible to win, the progressive jackpot. If the players "twenty one" hand has a particular, predetermined arrangement of cards, the player will win all, or part of, the amount showing on the progressive jackpot. This progressive jackpot feature is also adaptable to any other casino or card room game such as Draw Poker, Stud Poker, Lo-Ball Poker or Caribbean Stud. TM. Poker.

The apparatus used to practice the present invention comprises a gaming table, such as those used for "twenty one" or poker, modified with the addition of an acceptor that is electronically connected to a progressive jackpot meter. When a player drops a coin into the acceptor, a light is activated at the players location indicating that he is participating in the progressive enhanced pay out of the game during that hand. At the same time, a signal from the acceptor is sent to the progressive meter to increment the amount shown on the progressive meter. At the conclusion of the play of each hand, the acceptor is reset for the next hand. When a player wins all or part of the progressive jackpot, the amount showing on the progressive jackpot meter is reduced by the amount won by the player. Any number of gaming tables can be connected to a single progressive jackpot meter.

SUMMARY OF THE INVENTION

The method of the present invention provides a method of playing a new betting game having unique winning hands and an enhanced pay out schedule. Furthermore, the game method of the present invention provides the further possibility of very large winning amounts. Lastly, the method of the present invention provides for a betting game with appropriate winning probabilities to make the game feasible for gaming establishments to provide the game to players. If possible, the specifications should describe at least two embodiments of this invention.

Alternatively, a player eligible to receive a progressive jackpot (or some portion thereof) by making a maximum bet might also receive a pay out from an enhanced pay table wherein the maximum pay out would be a fixed jackpot paying at least 50 to 1.

A method of playing a card game at a card game table may have the steps including providing one or more decks of playing cards and displaying a pay table having a matrix listing predetermined hand rankings relative to the pay out for minimum to maximum level bets and wherein the maximum level bet pays an enhanced preset amount. To play the game the step of accepting a bet from each player by the act of each player placing one or more tokens in a table slot adjacent each player's location at the card game table is preferably performed. The step of dealing a hand so each player has at least several cards from the one or more decks so that each player may receive a predetermined amount based on the predetermined ranking of the hand that each player holds. Then the step of increasing the amount by the enhanced preset amount of pay out according to the pay table for each player that has made a maximum level bet and holds the card combination of predetermined ranking is most preferably followed.

The steps of dealing and the pay table matrix displaying can be performed during a card game of draw poker. The step of placing the bets is recorded automatically by each player placing one or more tokens in the player's respective acceptor and sensing placement with a sensor associated with each player's respective acceptor. The steps of dealing and the pay table matrix displaying may be performed during a card game of stud poker. The step of automatically recording could be performed by connecting each sensor of each respective acceptor to a computer programmed for the steps of comparing and calculating each players pay out according to each respective player bet and the pay table matrix listing by comparison of each hand dealt and the pay table matrix listing of pay out. The added step of displaying to at least the dealer the amount bet by each player and the potential calculated pay out for any possible winning hand of each player could follow. The step of connecting is preferably performed by transmitting radio frequency signals between the sensor and the computer. The step of connecting may be performed by transmitting radio frequency signals between the sensor and the computer and the step of displaying might be performed by receiving radio frequency information between the computer and the display.

The step of increasing the pay out received by each player according to the pay table matrix listing of predetermined hand rankings relative to pay out from minimum to maximum level bets and the enhanced preset pay out that each winning player may receive is as follows:

| | One Token | Two Tokens | Three Tokens |
|---|---|---|---|
| Royal Flush | 250X | 500X | 2500X |
| Straight Flush | 50X | 100X | 500X |
| Four-Of-A-Kind | 10X | 20X | 100X |
| Full House | 6X | 12X | 120X |
| Flush | 4X | 8X | 80X |
| Straight | 3X | 6X | 60X |
| Three-Of-A-Kind | 2X | 4X | 40X |
| Two Pair | 1X | 2X | 20X |

when X is the amount of each player's bet and three coins are the maximum level bet for the enhanced preset pay out. Although the enhancement is shown as ten times the pay out for one token bet, those skilled in the art will appreciate that any multiple can be used and that any number of tokens can be selected to be the maximum level bet. Information such as appears above could be displayed to the players and is usually called the pay table. The information on the pay table could be included in the computer to automatically calculate the amount that the winning player receives.

A method of playing a betting game which uses standard playing cards may have the steps of providing one or more decks of playing cards and posting a pay table having a matrix listing predetermined hand rankings relative to pay out for minimum to maximum level bets and wherein the maximum level bet pays an enhanced preset amount. The method may have each player placing an initial bet to participate in the game and accepting a second bet from each player by the act of each player placing one or more tokens in a table acceptor adjacent each player's location at the card game table. The step of dealing a hand so each player has at least several cards from the one or more decks can then be followed by each player receiving a predetermined pay out amount based on the predetermined ranking of the hand that each player holds. Then most preferred method includes increasing the amount of pay out for each player that has made a maximum level bet by the enhanced preset amount according to the pay table.

The step of each player placing the initial bet might be performed by inserting a token into the respective player's acceptor. The step of displaying the predetermined ranking of cards can include a plurality of poker hands. The method may require that prior to the step of awarding the preset amount, the player selects which cards in the hand to keep and those cards to discard. Thereafter the step of dealing replacement cards to replace the discarded cards may follow.

In an apparatus for including an enhanced pay out as an additional feature in a live casino table card game, there may be a gaming table having a plurality of player locations whereat a player receives playing cards from a dealer. The gaming table most preferably having a posted pay table matrix listing of pay out for maximum level or number of tokens bet and an acceptor associated with each player location for accepting token bets by which a player may make bets and also participate in the enhanced pay out from the live casino table card game. The acceptor could be coupled to a counter for registering the maximum level or number of tokens bet A sensor is preferred to be within each acceptor for signaling upon the event of each token bet. The live casino card gaming table may be electronically connected to a computer including the pay table matrix listing therein so the computer can compare and calculate each player's pay out according to each respective player's bet when compared to the hand dealt and the pay table matrix listing of pay out.

The counter could be connected within the computer for counting bets placed by each player in the acceptors and for determining the eligibility of each player for the enhanced pay out resulting from maximum tokens bet. The live casino table game might be poker and the pay table matrix listing of pay out has the ranking of winning hands for enhanced pay out when maximum level of betting has been made by the player. The live casino table card game can be stud poker and the pay table lists a royal flush as the winning hand for the enhanced pay out with maximum tokens bet by the player. A light is preferably associated with each playing location to indicate when the maximum bet has been placed in the acceptor by a player to participate in the enhanced pay out. A dealer activated lockout for preventing players from participating in the enhanced pay out jackpot by betting after cards are dealt. A reset may be included for reinitiating the apparatus at the end of each hand of the live casino table card game upon activation of the reset by the dealer. A card deck shoe for delivery of cards to be dealt by the dealer and a reader in the shoe for monitoring card hands dealt therefrom could be used when the reader connects to the computer for indicating each players hand and for computing the pay out consistent with the pay table and maximum level or number of tokens placed in the respective acceptor by each player.

Means for showing the amount of each player's bet and that player's eligibility to win the enhanced pay out when dealt a predetermined winning combination of cards may be provided. The live casino table card game can be "twenty one" and the enhanced pay out is preferably obtained with a two-card combination totaling twenty-one. The live casino table card game may be draw poker and the pay table matrix listing shows that the winning combination of cards for the enhanced pay out includes a royal flush.

A table for playing a live casino card game having an enhanced pay out as an additional feature with the bet to participate in the enhanced pay out is optional and in addition to bets for the card game, the table may have an acceptor operatively associated with the table and operative to recognize and signal placement of gaming tokens at each player location of the table and for participation in the enhanced pay out. An indicator can illuminate when the number of gaming tokens has been recognized by the acceptor for participation in the enhanced pay out. A sensor operatively connected to read the presence of gaming tokens may be in the acceptor. A counter electronically interconnected to the acceptor and operative to count gaming tokens recognized by the acceptor of each player. The pay table matrix listing can afford an enhanced pay out including a progressive jackpot or portion thereof attainable with maximum level bets.

The jackpot may include alternatively preselected, fixed fee jackpot pay out amounts. A computer can electronically be interconnected with the acceptor and operative to control and register the occurrence or recognition of the placement of gaming tokens in the acceptor. A manually operable lock out switch might be operatively connected to deactivate the acceptor such that the computer does not register the occurrence or recognition of the placement of a gaming token by the acceptor.

A table for playing a live casino card game has an enhanced pay out as an additional feature having the bet to participate in the enhanced pay out is optional and separate from bets for the card game. An acceptor operatively associated with the table and operative to recognize the placement of gaming tokens for participation in the enhanced pay out and a counter electronically interconnected to the acceptor and adapted to count gaming tokens bet through the acceptor. A computer could be electronically interconnected with the acceptor and operative to register and control the occurrence or recognition of the placement of gaming tokens in the acceptor so a manually operable lock out switch operatively connected deactivates the acceptor such that the computer does not register the occurrence of the placement of gaming tokens. A pay table might have a matrix listing the enhanced pay out jackpot preferably including a preselected, fixed fee jackpot pay out amount for maximum level betting. A counter electronically interconnects, in the preferred embodiment, to the acceptor and operative to count gaming tokens recognized by the acceptor and registered by the computer.

In a live casino card gaming table having an enhanced pay out as an additional feature and with the bet to participate in the enhanced pay out is optional and separate from bets for the card game, the table preferably has at least one electronic acceptor operatively associated with the table and operative to recognize placement of maximum level of gaming tokens as a bet for participation in the enhanced pay out. In a live casino card gaming table having an enhanced pay out as an additional feature and with the bet to participate in the enhanced pay out is optional and separate from bets for the card game, the table may include a plurality of player locations at which players receive cards from a dealer to play the card game; and a plurality of electronic acceptors. Each of the acceptors is preferably and operatively associated with a corresponding one of the player locations and is operative to recognize placement of maximum level of gaming tokens as a bet for participation in the enhanced pay out.

In a live casino card gaming table having an enhanced pay out as an additional feature with the bet to participate in the enhanced pay out optional and separate from bets for the card game, the table may have a plurality of player locations at which a player receives playing cards from a dealer and a jackpot control might include a plurality of buttons adapted for manual activation by the dealer. The buttons corresponding to a plurality of predetermined winning arrangements of the playing cards achieved by a player for winning a progressive jackpot payoff amount or portion thereof in accordance with a predetermined payoff table. The payoff table may include the jackpot or portion thereof as the enhanced pay out for at least one type of achieved player hands or card combinations when a bet has been made to the maximum level.

In a live casino card game table, the table having a plurality of player locations at which a player receives playing cards from a dealer to play the live casino table card game there may be a plurality of sensors. Each sensor associated with a corresponding one of the player locations, for sensing placement of gaming tokens bet by a player and a plurality of light indicators, each indicator associated with a corresponding one of the player locations, can visually indicate that a player has bet gaming tokens. A counter is preferably connected with the sensors for counting tokens bet by each player. A light indicator for visually could indicate that a player has bet gaming tokens necessary to participate in the enhanced pay out.

An acceptor for receiving one or more tokens may be positioned in the table and located accessible to players for deposit of tokens therein. A computer could be operatively connected to the acceptor. A sensor within the acceptor for sensing placement and acceptance of the one or more tokens into the acceptor and for signaling the computer so a counter within the computer can count the number of signaled accepted tokens. A visual display operatively connected to the computer and operative may pursuant to control instructions from the computer display visually the maximum level or number of tokens placed and accepted in the acceptor. The visual display might have a plurality of light sources disposed in a predetermined pattern or simultaneous flashing of the light sources or sequential flashing of the light sources. The acceptor can be on the table gaming apparatus including cards so the acceptor detects bets and has a slot dimensioned for insertion of the one or more tokens in the form of coins or a receptacle dimensioned for receipt of the one or more tokens and the sensor detects each token placed in the receptacle.

The table most preferably includes one or more acceptors for receiving one or more tokens with each acceptor positioned in the table and located accessible to a player for deposit of tokens therein. A computer operatively connected to the acceptors, a sensor within the acceptor for sensing tokens bet and for acceptance of each token as a bet into the acceptor, a counter within the computer and connected to each sensor are most preferred. The counter for recording the maximum level or number of tokens bet and accepted and a visual display operatively connected to the computer and operative, pursuant to control instructions from the computer can display a visual state corresponding to the number of tokens bet in each acceptor. One of the acceptors might be disposed at each player location of the card gaming table and operatively connected to display the visual state of at least the maximum level of tokens bet to win an enhanced pay out and to allow multi player participation in the enhanced pay out wherever each player bets the maximum level of tokens in their respective acceptor. A plurality of light sources disposed in a predetermined pattern to show maximum level bets by simultaneous or sequential flashing of the light sources.

A method of indicating the condition of an acceptor of a card game table for one or more players may have the steps of providing an acceptor dimensioned to receive one or more tokens from one or more players. The acceptor associated preferably with the card game table and has respective token receiving receptacles for each of the one or more players. The step of providing a computer operatively connected to the acceptor is preferred. The step of providing a sensor within the acceptor for sensing bets by acceptance of one or more tokens into the acceptor is followed. Providing a counter within the computer for counting the number of bet and accepted tokens is a preferred step of the method. The method may have the steps of providing a visual display operatively connected to the computer and displaying on the visual display pursuant to control instructions from the computer the number of tokens bet by each player and registering any maximum level betting for enhanced pay out. The method step of providing the visual display might be by the step of providing a plurality of light sources with simultaneously or sequentially flashing the light sources. The method wherein the step of displaying can be by the step of showing which of the one or more players has bet the maximum level of tokens.

DETAILED DESCRIPTION OF THE DRAWINGS

Figure 1:
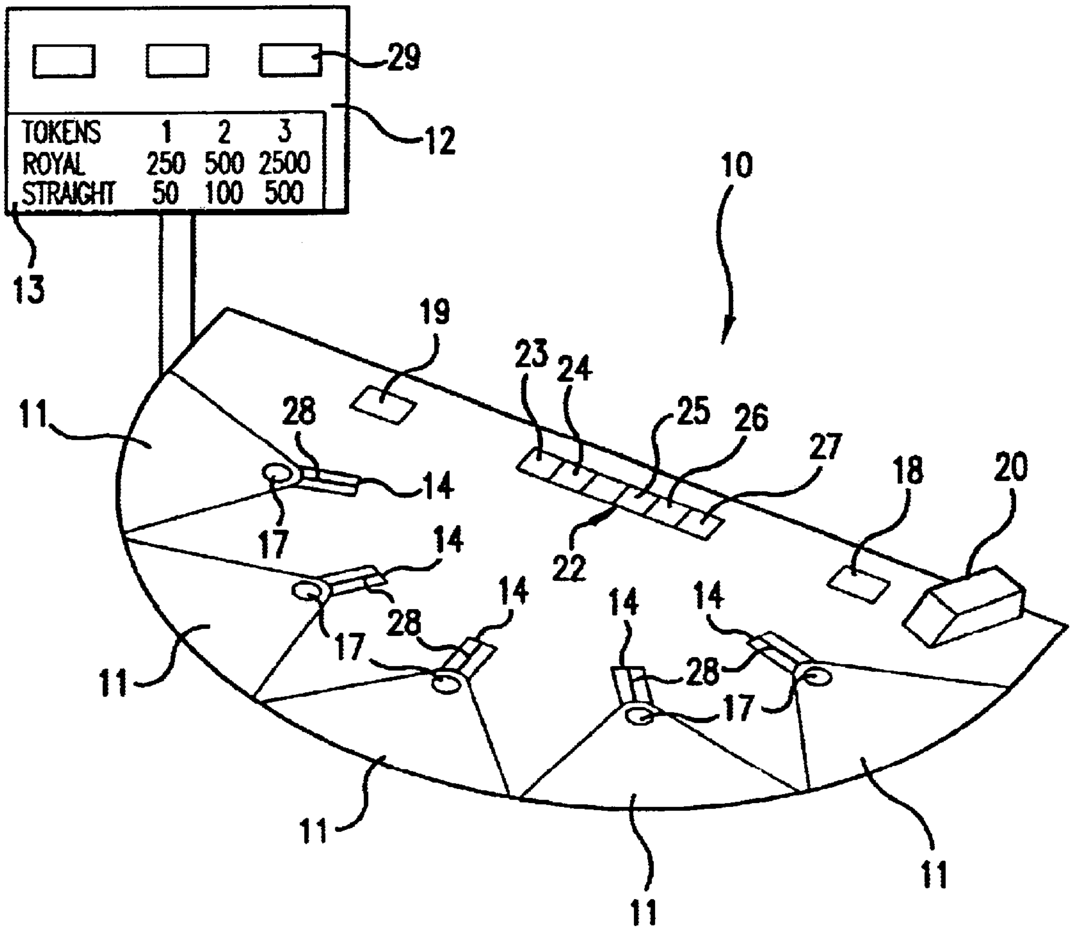
FIG. 1 is a perspective of an apparatus of the present invention including a casino gaming table with acceptors at each playing location for electronically connecting to a progressive jackpot meter.

In FIG. 1 there is an apparatus for including an enhanced pay out as an additional feature in a live casino table card game. The apparatus has a gaming table 10 having a plurality of player locations 11 whereat each player receives playing cards from a dealer. The gaming table 10 has a display 12 with a posted pay table matrix listing 13 of pay out for number of tokens bet for card combinations received as best depicted in FIG. 1. An acceptor 14 associated with each player location 11 for accepting token bets by which a player may make bets and also participate in the enhanced pay out from the live casino table card game. Each acceptor 14 may be of the type described in the prior patents noted and included by reference in the background. Any coin, token or currency validating device known to skilled artisans would also be acceptable for use in the present invention. Acceptor 14 includes a sensor 14' that validates the bet by token authentication. Sensor 14' couples to a counter 15 for counting tokens bet to enable the registering of the maximum level of tokens bet for winning the enhanced pay out.

The apparatus has the sensor 14' within each acceptor 14 for signaling the counter 15 upon the event of each token bet. The counter 15 signals the fulfillment of the maximum level of tokens bet by each player. The live casino card gaming table 10 counter 15 electronically connects to a computer 16 that has the pay table matrix listing 13 therein. The computer 16 for compares and calculates each player's pay out according to each respective player's bet by comparing each the hand dealt with the pay table matrix listing 13 of pay out. The counter 15 connects to or may be within the computer 16 for counting bets placed by each player in each respective acceptor 14. The counter 15 and the computer 16 determine the eligibility of each player to receive the enhanced pay out resulting when maximum tokens were bet and winning card combinations were received. When the live casino table 10 game is for poker, the pay table matrix listing 13 of the pay out includes the ranking according to card combinations of winning hands for poker. Enhanced pay out is received only when the maximum level of betting has been made by the player. If the card game is stud poker, the pay table may list a royal flush as the winning hand for the enhanced pay out with maximum tokens bet by the player.

Figure 2:
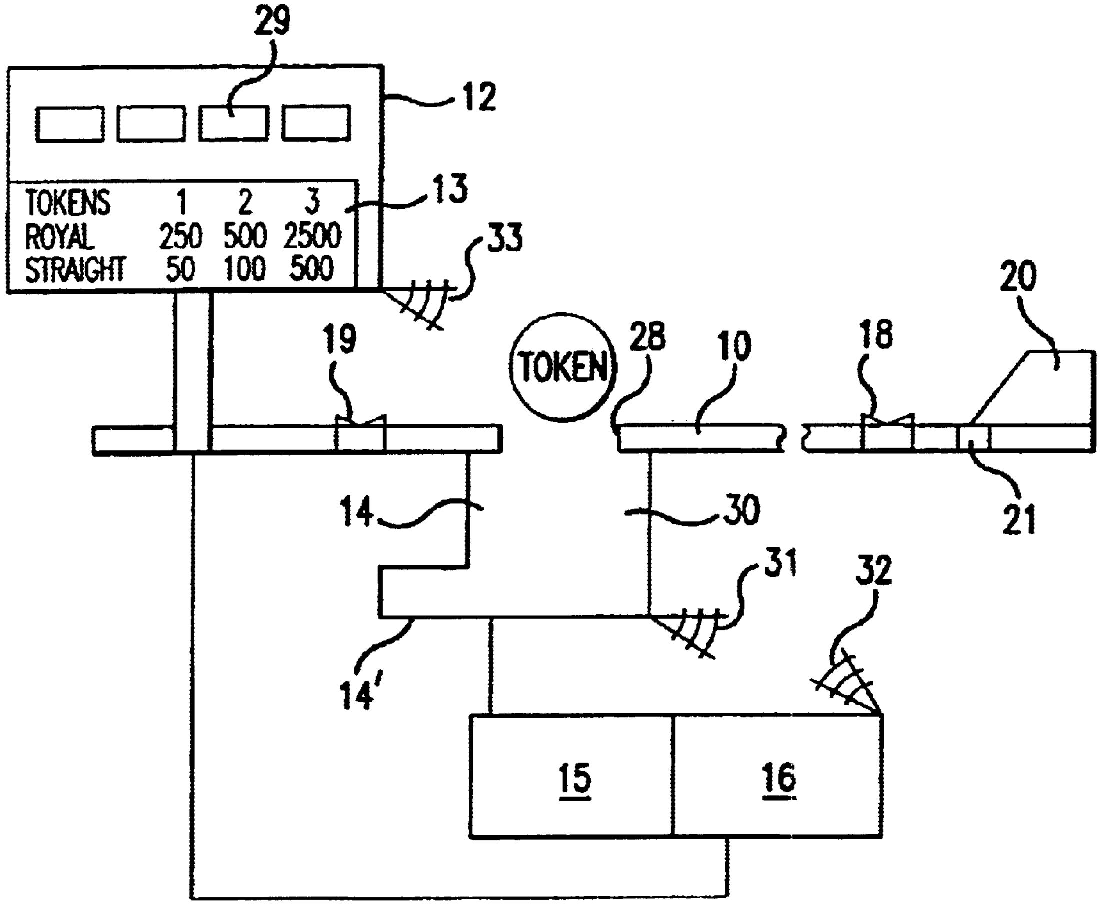
FIG. 2 shows a schematic side cross section of one acceptor of one player location and the connections that acceptor with the display, counter and computer for the casino gaming table.

A light 17 is associated with each playing location 11 to indicate when the maximum level bet has been placed in any one or more player's acceptor 14 for eligibility to participate in the enhanced pay out. A dealer lockout 18 is connected to the computer 16 and disconnects the acceptors 14 to prevent players from participating in the enhanced pay out jackpot by betting after cards are dealt A reset 19 reinitiates the lockout at the end of each hand of the live casino table 10-card game. The activation of the reset 19 may be automatic or by the dealer, see FIGS. 1 and 2. A card deck shoe 20 may be used for delivery of cards dealt by the dealer. A reader 21 is positioned in the shoe 20 to monitor card hands dealt therefrom and the relative location of the reader 21 is best shown in FIG. 2. The reader 21 connects to the computer 16 for indicating automatically each player's hand and for computing the pay out consistent with the pay table and maximum level or number of tokens placed in the respective acceptor 14 by each player.

The game table 10 has counter 15 and display 12 coupled to the computer 16; the display 12 shows the amount of each player's bet and that player's eligibility to win the enhanced pay out when dealt a predetermined winning card combination after betting the maximum level of tokens. Should the live casino table 10 card game be "twenty one", the enhanced pay out is obtained with a maximum level bet and a two card combination totaling twenty one. If the live casino table 10 card game is draw poker and the pay table matrix listing 13 shows that the winning combination of cards for the enhanced pay out with a maximum level bet is a royal flush.

A table 10 for playing a live casino card game has an enhanced pay out as an additional feature whenever a maximum level bet to participate in the enhanced pay out is optionally made in addition to bets for the card game. Acceptor 14 is accessible to each player and is on the table 10 and operative to recognize and signal maximum placement of gaming tokens at each player location 11 of the table 10 for participation in the enhanced pay out. Light 17 illuminates when the maximum level of gaming tokens have been recognized by the acceptor 14 for participation in the enhanced pay out. The dealer is thus notified that an enhanced pay out must be made when there is a winning combinations of cards in the player's hand.

The acceptor 14 includes sensor 14' operatively connected to read the presence of gaming tokens and sensor 14' couples to indicator light 17. Counter 15 electronically interconnects to each sensor 14' and is operative to count gaming tokens received by the acceptor 14 from each player. Pay table matrix listing 13 affords an enhanced pay out including but not limited to a progressive jackpot or portion thereof attainable with maximum level bets. The jackpot includes preselected, fixed fee jackpot pay out amounts of enhanced amounts for maximum level betting. Computer 16 electronically interconnects with the acceptor 14, the sensor 14' and the counter 15 is operative to control and register the occurrence or recognition of the placement of the maximum level of gaming tokens in the acceptor 14 for each player location 11. A dealer operable lock out 18 switches to deactivate the acceptor 14 after the cards are dealt so the computer 16 can not register the occurrence or recognition of the placement of a gaming token by the acceptor 14. Enhanced pay out is an additional feature as the bet to participate in the enhanced pay out is optional and separate from bets for the card game. Acceptor 14 operatively associated with the table is used to recognize the placement of the maximum level of gaming tokens for enhanced pay out. Counter 15 electronically interconnects to sensor 14' and is adapted to count gaming tokens bet through the acceptor 14.

Table 10 for playing a live casino card game has enhanced pay out as an additional feature when the bet to participate in the enhanced pay out is optional and separate from bets for the card game. Each acceptor 14 operatively associated with the table recognizes the placement of the maximum level of gaming tokens by each player as required for participation in the enhanced pay out. Computer 16 electronically interconnects with each acceptor 14 and operates to register and control the recognition of the placement of the maximum level of gaming tokens in each acceptor 14 of each player. Dealer operable lock out 18 switches to deactivate acceptors 14 after the cards are dealt so the computer 16 can not register the placement of gaming tokens. The pay table has a matrix listing 13 of the enhanced pay out jackpot including a preselected, fixed fee enhanced jackpot pay out amount for maximum level betting. The enhanced jackpot pay out may be a progressive tied into other tables which have the maximum level bet apparatus and method disclosed. Counter 15 electronically interconnects to the acceptor 14 and operates to count gaming tokens recognized by the acceptor 14 and registered by the computer 16 as shown in FIGS. 1 and 2.

A live casino card gaming table 10 has enhanced pay out as an additional feature when the bet to participate in the enhanced pay out is optional and separate from bets for the card game. The table 10 has at least one electronic acceptor 14 operatively associated with the pay table and operative to recognize placement of maximum level of gaming tokens as a bet for participation in the enhanced pay out. The table 10 includes a plurality of player locations 11 at which players receive cards from a dealer to play the card game and a plurality of electronic acceptors 14. Each of the acceptors 14 operatively associates with a corresponding one of the player locations 11 and recognizes placement of maximum level of gaming tokens as a bet for participation in the enhanced pay out. The table 10 has a plurality of player locations 11 at which a player receives playing cards from a dealer. A jackpot control 22 including a plurality of buttons 23, 24, 25, 26 and 27 adapted for manual activation by the dealer. The buttons 23, 24, 25, 26 and 27 correspond to a plurality of predetermined winning arrangements of the playing cards that may be attained by a player for winning. An enhanced jackpot payoff amount in accordance with a predetermined payoff table includes enhanced pay out for at least one type of achieved player hands or card combination when a bet has been made to the maximum level. A plurality of sensor 14' positioned with one sensor 14' at each of the corresponding player locations 11 senses placement of gaming tokens bet by a player. A plurality of lights 17 each indicate at a corresponding one of the player locations 11 that player has bet the maximum level of gaming tokens. Counter 15 connects with each sensor 14' for counting tokens bet by each player. Each light 17 visually indicates that a player has bet the maximum level of gaming tokens necessary to participate in the enhanced pay out. Counter 15 connects with the sensor 14' for counting the tokens bet by the player to participate by the maximum level bet in the enhanced pay out.

Table 10 includes a visual display 12 and each acceptor 14 has a slot 28. The slot 28 receives one or more tokens and each slot 28 is positioned in the table 10 and located accessible to each player location 11. Each slot 28 is for deposit of tokens therein. Computer 16 operatively connects to each acceptor 14. Sensor 14' within each acceptor 14 senses placement and acceptance of the one or more tokens into that acceptor 14 and signals the computer 16 when at least the maximum level of tokens have been bet. Counter 15 may be within the computer 16 and counter 15 counts the number of signaled accepted tokens. Visual display 12 operatively connects to the computer 16 and operates pursuant to control instructions from the computer 16 to display 12 visually the maximum level or number of tokens placed each slot 28 and accepted in each acceptor 14.

The visual display 12 has a plurality of light sources 29 disposed in a predetermined pattern. The visual display 12 for maximum tokens accepted can correspond to simultaneous flashing of the light sources 29. The visual display 12 for maximum tokens accepted could correspond to sequential flashing of the light sources 29. The acceptor 14 is on a gaming apparatus including cards. The acceptor 14 detects bets and includes he slot 28 dimensioned for insertion of the one or more tokens in the form of coins. Each slot 28 includes in an embodiment a receptacle 30 dimensioned for receipt of the one or more tokens and the sensor 14' detects each token placed in the receptacle 30.

Table 10 is a gambling device having one or more acceptors 14 for receiving one or more tokens and each acceptor 14 is positioned in table 10 and located accessible to a player for deposit of tokens therein. Computer 16 operatively connects to the acceptors 14 via sensor 14' within acceptor 14 to sense tokens bet. Sensor 14' accepts each token as a bet deposited into each acceptor 14. Counter 15 within the computer 16 connects to each sensor 14' and counter 15 records the maximum level or number of tokens bet and accepted. Visual display 12 operatively connects to the computer 16 and operates pursuant to control instructions from the computer 16 to display 12 at least a visual state corresponding to the maximum level of tokens bet in each acceptor 14. A pay table matrix listing 13 includes the card combination necessary to win enhanced pay out with maximum level betting. One acceptor 14 is disposed at each player location 11 of the card gaming table 10. Each acceptor 14 operatively connects to display the visual state of at least the maximum level of tokens bet to win enhanced pay out and to allow multi player participation in the enhanced pay out wherever one or more players bet the maximum level of tokens in their respective acceptor 14. The visual display 12 has a plurality of light sources 29 disposed in a predetermined pattern to show maximum level bets by simultaneous or sequential flashing of the light sources 29.

Figure 3:
FIG. 3 shows a flow chart of one method of the present invention.
Figure 4:
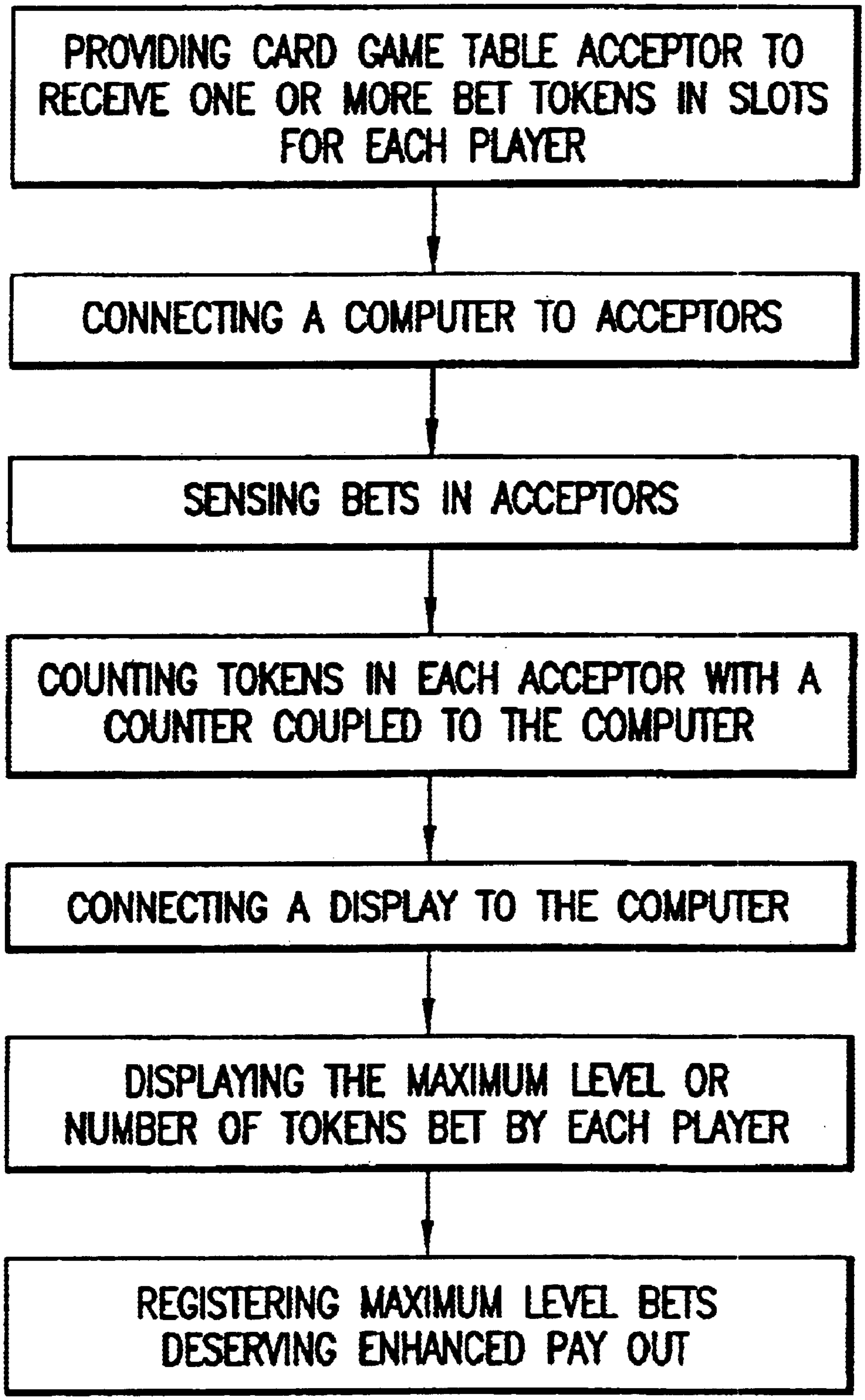
FIG. 4 shows a flow chart of another method of the present invention.
Figure 5:
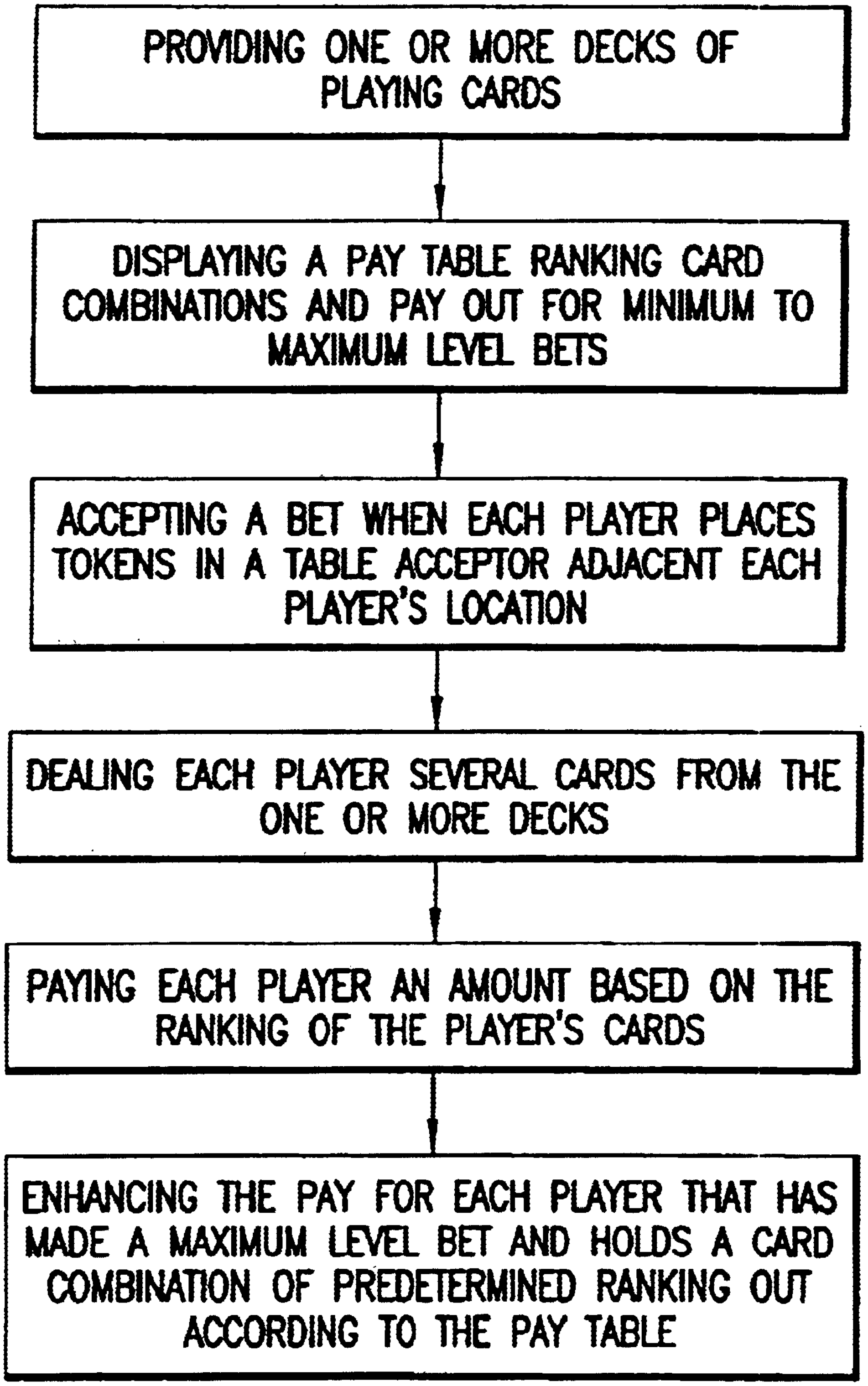
FIG. 5 shows a flow chart of a further method of the present invention.

Also included are several methods of practicing the invention as shown in the flow charts of FIGS. 3, 4 and 5 and as described hereinafter in this specification. One method of playing a card game at a card game table 10 has the steps of:

- providing one or more decks of playing cards; displaying pay table matrix listing 13 of predetermined hand ranking card combinations relative to the pay out for minimum to maximum level bets and wherein the maximum level bet pays an enhanced amount;
- accepting a bet from each player by the act of each player placing one or more tokens in acceptor 14 of table 10 adjacent each player's location 11;
- dealing a hand so each player has at least several cards from the one or more decks;
- each player receiving a predetermined pay out amount based on the predetermined ranking of the hand that each player holds, and
- increasing the amount by the enhanced preset amount of pay out according to the pay table matrix listing 13 for each player that has made a maximum level bet and holds a card combination of predetermined ranking.

The method wherein the steps of dealing and the pay table matrix listing 13 are performed during a card game of draw poker and the card combinations are ranked accordingly. The method includes the step of placing the bets includes the step of recording automatically in computer 16 when each player places one or more tokens in the player's respective acceptor 14 and sensing placement with sensor 14' associated with each player's respective acceptor 14. The method has the step of dealing performed during a card game of stud poker and the card combinations are ranked accordingly. The step of automatically recording is performed by connecting each sensor 14' of each respective acceptor 14 to computer 16 that is programmed for the steps of comparing and calculating each player's pay out according to each respective player bet and the pay table matrix listing 13. The added step of displaying to at least the dealer the amount bet by each player and the potential calculated pay out for any possible winning hand of each player.

The step of connecting is performed by transmitting radio frequency signals 31 between the sensor 14' and the computer 16 as schematically shown in FIG. 2. The step of connecting is performed by transmitting radio frequency signals 31 between the sensor 14' and the computer 16 and the step of displaying is performed by sending radio frequency information 32 between the computer 16 and the display 12 at 33 as shown in FIG. 2. While radio frequency is mentioned, any transmission and even hard wiring are within the skill of ordinary technicians in the electronics field. Disclosure of techniques and equipment for transmission and receipt of electromagnetic signals including radio frequencies is disclosed for another use in pending application U.S. Ser. No. 09/249,453, entitled: GAME TABLE PLAYER COMP RATING SYSTEM AND METHOD THEREFOR which is incorporated herein by reference and made a part hereof.

The step of increasing the pay out received by each player according to the pay table matrix listing 13 of predetermined hand rankings relative to pay out from minimum to maximum level bets and the enhanced preset pay out that each winning player may receive is in one embodiment for poker, as follows:

| | One Token | Two Tokens | Three Tokens |
|---|---|---|---|
| Royal Flush | 250X | 500X | 2500X |
| Straight Flush | 50X | 100X | 500X |
| Four-Of-A-Kind | 10X | 20X | 100X |
| Full House | 6X | 12X | 120X |
| Flush | 4X | 8X | 80X |
| Straight | 3X | 6X | 60X |
| Three-Of-A-Kind | 2X | 4X | 40X |
| Two Pair | 1X | 2X | 20X |

and when X is the amount of each players bet and three tokens are the maximum level bet for the enhanced preset pay out. Although the enhancement is shown as ten times the pay out received for one token bet, those skilled in the art will appreciate that any multiple can be used and that any number of tokens can be selected to be the maximum level bet. Information such as appears above would be displayed to the players and is designated herein the pay table matrix listing 13. The information on the pay table matrix listing 13 could be included in the computer 16 to automatically calculate the amount that each winning player receives. Light sources 29 could be coupled to the computer 16 to automatically display the enhanced pay out and would increase the excitement of the game.

A method of playing a betting game that uses standard playing cards has the steps of:

- providing one or more decks of playing cards;
- posting a pay table matrix listing 13 with predetermined hand rankings relative to pay out for minimum to maximum level bets and wherein the maximum level bet pays an enhanced preset amount;
- each player placing an initial bet to participate in the game;
- accepting a second bet from each player by the act of each player placing one or more tokens in a table 10 acceptor 14 adjacent each player's location 11 at the card game table 10;
- dealing a hand so each player has at least several cards from the one or more decks;
- each player receiving a predetermined pay out amount based on the predetermined ranking of the hand that each player holds, and
- increasing the amount of pay out for each player that has made a maximum level bet for the enhanced preset amount according to the pay table matrix listing 13.

The step of each player placing the initial bet is performed by inserting a token into the respective player's acceptor 14. The step of displaying the predetermined ranking of cards includes listing a plurality of poker hands. The method wherein prior to the step of awarding the preset amount, the method further includes the steps of:

the player selecting cards in the hand to keep and cards to discard, and dealing replacement cards to replace the discarded cards.

A method of indicating the condition of acceptor 14 of card game table 10 for one or more players, has the steps of:

providing acceptor 14 dimensioned to receive one or more tokens from one or more players, acceptor 14 associated with card game table 10 and having respective token receiving receptacles 30 for each of the one or more players;

providing computer 16 operatively connected to acceptor 14;

providing sensor 14' within acceptor 14 for sensing bets by acceptance of one or more tokens into acceptor 14;

providing counter 15 within computer 16 for counting the number of bet and accepted tokens;

providing visual display 12 operatively connected to computer 16; and displaying on visual display 12 pursuant to control instructions from computer 16 the maximum level or number of tokens bet by each player, and registering any maximum level betting for enhanced pay out.

The method with the step of providing the visual display 12 includes the step of providing a plurality of light sources 29. The step of displaying the visual display 12 includes the step of simultaneously or sequentially flashing the light sources 29. The step of displaying includes the step of showing which of the one or more players has bet the maximum level of tokens.

It should be understood that the above described methods and apparatuses could be altered in numerous ways without departing from the principles of the invention. All modifications coming within the scope and spirit of the following claims are to be protected.

What is claimed is:

1. A live casino card game on a game table having a plurality of player locations, said game table having an enhanced apparatus payoff separate from the play of the live casino card game, said enhanced payoff apparatus comprising:

an acceptor on the game table for receiving a plurality of bet amounts from a player, said acceptor sensing each received bet amount up to a maximum bet;

at least one display on the game table, said at least one display having a preset payout for each of a plurality of predetermined hands in said live casino card game, said preset payout increasing in value with each received bet amount, wherein said preset payout increases more with a final bet amount providing said maximum bet than with bet amounts providing a total bet below said maximum bet.

2. The live casino card game of claim 1 wherein said enhanced payoff apparatus further comprises:

an indicator corresponding to each said player location, said indicator being activated when said acceptor senses said maximum bet.

3. The live casino card game of claim 1 wherein said preset payout increases in value, for a given bet, for each one of said plurality of predetermined hands.

4. The live casino card game of claim 1 wherein said display is a pay table matrix visible by said player.

5. A live casino card game on a game table having a plurality of player locations, said game table having an enhanced apparatus payoff separate from the play of the live casino card game, said enhanced payoff apparatus comprising:

an acceptor on the game table for receiving a plurality of bet amounts from a player, said acceptor sensing each received bet amount up to a maximum bet; and at least one display on the game table, said at least one display having a preset payout for each of a plurality of predetermined hands in said live casino card game, said preset payout increasing in value with each received bet amount and increasing more in response to a final bet amount providing said maximum bet than with bet amounts providing a total bet below said maximum bet.

6. The live casino card game of claim 5 wherein said enhanced payoff apparatus further comprises:

an indicator corresponding to each said player location, said indicator being activated when said acceptor senses said maximum bet.

7. The live casino card game of claim 5 wherein said preset payout increases in value, for a given bet, for each one of said plurality of predetermined hands.

8. The live casino card game of claim 5 wherein said display is a pay table matrix visible by said player.

9. A live casino card game on a game table having a plurality of player locations, said game table having an enhanced apparatus payoff separate from the play of the live casino card game, said enhanced payoff apparatus comprising:

a computer located at said game table;

an acceptor on the game table, and in communication with said computer, for receiving a plurality of bet amounts from a player, said acceptor sensing each received bet amount up to a maximum bet;

at least one display on the game table and in communication with said computer, said at least one display having a preset payout for each of a plurality of predetermined hands in said live casino card game, said preset payout increasing in value with each received bet amount and increasing more in response to a final bet amount providing said maximum bet than with bet amounts providing a total bet below said maximum bet; and an indicator corresponding to each said player location, said indicator being activated when said acceptor senses said maximum bet.

10. The live casino card game of claim 9 wherein said preset payout increases in value, for a given bet, for each one of said plurality of predetermined hands.

11. The live casino card game of claim 9 wherein said display is a pay table matrix visible by said player.

12. The live casino card game of claim 9 further comprising:

a radio frequency link between said display and said computer enabling said communication therebetween.

13. The live casino card game of claim 9 further comprising:

a hard wired link between said display and said computer enabling said communication therebetween.

* * * * *